(12) United States Patent
Rudy (10) Patent No.: US 7,396,574 B2
(45) Date of Patent: Jul. 8, 2008

(54) SELF-INFLATING CUSHION AND FOOTWEAR INCLUDING SAME

(75) Inventor: Marion Franklin Rudy, Calabasas Park, CA (US)

(73) Assignee: Robert C. Bogert, Los Angeles, CA (US)

( * ) Notice: Subject to any disclaimer, the term of this patent is extended or adjusted under 35 U.S.C. 154(b) by 0 days.

(21) Appl. No.: 10/447,095

(22) Filed: May 28, 2003

(65) Prior Publication Data

US 2004/0237346 A1 Dec. 2, 2004

(51) Int. Cl.
 *B29D 22/00* (2006.01)
 *B29D 23/00* (2006.01)
 *B32B 1/08* (2006.01)

(52) U.S. Cl. .................. 428/35.7; 428/36.5; 428/71; 428/76; 428/36.6; 36/29

(58) Field of Classification Search .............. 428/35.7, 428/36.5, 76, 36 T, 36.91, 71, 36.6; 441/31, 441/92, 98; 602/13; 434/138; 137/223; 280/728.1, 736, 741, 742; 383/3; 5/710, 5/655.3; 36/28, 29; 604/96.01, 97.01, 98.01, 604/99.03, 103.01, 103.02, 103.05, 103.11
See application file for complete search history.

(56) References Cited

U.S. PATENT DOCUMENTS

| | | |
|---|---|---|
| 259,092 A | 6/1882 | Butterfield |
| 2,274,252 A * | 2/1942 | Tanberg ............ 426/562 |
| 3,005,272 A | 10/1961 | Shelare et al. |
| 3,685,176 A | 8/1972 | Rudy |
| 3,760,056 A | 9/1973 | Rudy |
| 3,788,322 A * | 1/1974 | Michaels ............ 604/890.1 |
| 3,921,232 A | 11/1975 | Whyte |
| 4,183,156 A | 1/1980 | Rudy |
| 4,217,705 A | 8/1980 | Donzis |
| 4,219,945 A | 9/1980 | Rudy |
| 4,271,706 A | 6/1981 | Ledley |
| 4,287,250 A | 9/1981 | Rudy |
| 4,297,797 A | 11/1981 | Meyers |
| 4,340,626 A | 7/1982 | Rudy |
| 4,370,754 A | 2/1983 | Donzis |
| 4,471,538 A | 9/1984 | Pomeranz et al. |
| 4,486,901 A | 12/1984 | Donzis |
| 4,506,460 A | 3/1985 | Rudy |
| 4,724,627 A | 2/1988 | Sisco |

(Continued)

FOREIGN PATENT DOCUMENTS

WO WO/03/075699 9/2003

*Primary Examiner*—Michael Miggins
(74) *Attorney, Agent, or Firm*—Fay Sharpe LLP (57) ABSTRACT

A cushion comprised of at least one chamber comprised of a barrier material, said barrier material comprised of an elastomer, said elastomer being at least semi-permeable to at least a first reactant compound, a second reactant compound disposed within said at least one chamber, wherein said first reactant compound and said second reactant compound react to form a resultant compound, and wherein a rate of diffusion of said resultant compound through said barrier material is less than a rate of diffusion of said first reactant compound through said barrier material. An article of footwear including a cushion, said cushion comprised of at least one chamber comprised of a barrier material, at least a first and a second solid or liquid reactant compounds disposed within said at least one chamber, wherein said first reactant compound and said second reactant compound react to form a resultant gaseous compound.

21 Claims, 2 Drawing Sheets

U.S. PATENT DOCUMENTS

| | | |
|---|---|---|
| 4,779,359 A | 10/1988 | Famolare, Jr. |
| 4,817,304 A | 4/1989 | Parker et al. |
| 4,829,682 A | 5/1989 | Gasbarro |
| 4,864,737 A | 9/1989 | Marrello |
| 4,864,738 A | 9/1989 | Horovitz |
| 4,874,640 A | 10/1989 | Donzis |
| 4,906,502 A | 3/1990 | Rudy |
| 4,936,029 A | 6/1990 | Rudy |
| 5,042,176 A | 8/1991 | Rudy |
| 5,063,603 A | 11/1991 | Burt |
| 5,083,361 A | 1/1992 | Rudy |
| 5,097,607 A | 3/1992 | Fredericksen |
| 5,155,937 A | 10/1992 | Yamagishi et al. |
| 5,203,793 A * | 4/1993 | Lyden .......... 36/88 |
| 5,228,217 A | 7/1993 | Dabuzhsky et al. |
| 5,235,715 A | 8/1993 | Donzis |
| 5,245,766 A | 9/1993 | Warren |
| 5,283,963 A | 2/1994 | Lerner et al. |
| 5,315,769 A | 5/1994 | Barry et al. |
| 5,330,459 A | 7/1994 | Beck |
| 5,422,186 A | 6/1995 | Biggeleben et al. |
| 5,543,194 A * | 8/1996 | Rudy .......... 428/69 |
| 5,713,141 A | 2/1998 | Mitchell et al. |
| 5,937,462 A | 8/1999 | Huang |
| 5,992,700 A * | 11/1999 | McGlothlin et al. ......... 222/187 |
| 6,127,010 A | 10/2000 | Rudy |
| 6,158,149 A | 12/2000 | Rudy |

* cited by examiner

SELF-INFLATING CUSHION AND FOOTWEAR INCLUDING SAME

BACKGROUND OF THE INVENTION

Articles of footwear have long been studied and redesigned to achieve enhanced comfort and performance. In this regard, and particularly in athletic shoes, primary concerns include the ability to provide the foot with a comfortable environment and to mitigate the shock or impact experienced when the shoe and, accordingly the foot and lower leg, impact the ground or floor. These forces are particularly significant during running and jumping. For example, a jogger landing on four or five square inches of the heel is estimated to absorb an impact force of about three to four times the weight of the jogger. Accordingly, a jogger of 180 pounds may create an approximate force of 720 pounds of shock on the heel landing area. Since each heel could impact the ground about 800 times per mile, it is easy to see the necessity of a shock absorbing mechanism in footwear.

In addition to a requirement that the shoe absorb intense and repeated impact, the criticality of comfort is readily understood by everyone who wears shoes. In fact, comfort in athletic shoes is known to effect the wearer's psychological state, and, therefore, his or her performance, muscular efficiency, energy consumption, and the athlete's ability to train and compete.

A great many shock absorbing devices exist in the footwear art to absorb the shock of foot strike and provide overall comfort. One common approach to impact absorption has involved using blocks of a compressible padding material. For example, shoes have been constructed with cotton padding, horsehair padding, rubber, plastic, foam, and the like. In these shoes, the inherent resilience of the compressible padding material is used to absorb and disperse impact. However, these materials are relatively inefficient in their ability to return energy to the shoe wearer, and after repeated use become compacted and lose their cushioning properties. Furthermore, on severe impacts, unless a relatively thick block of compressible padding is used, these designs experience full compression or "bottom out" quickly which results in severe impact stress on the wearer's body. When made thicker to avoid this problem, the compressible padding material becomes cumbersome and heavy and can interfere with the design of the footwear and an athlete's performance. In addition, when the padding material is thick, instability may be encountered.

Within the grouping of cushions constructed of compressible padding materials, foam inserts are preferred in athletic footwear because of their light weight and relatively favorable cushioning characteristics. Notwithstanding the superiority of foam within the compressible padding material group, it has been found that the cellular structure of a foam insert degrades with time and cyclic loading, resulting in collapse of the cell walls, and the corresponding rapid reduction in the cushioning characteristics of the insert.

Arguably, the preeminent foot wear cushion is a pneumatic device. As demonstrated by U.S. Pat. No. 259,092 (1882), pneumatic shoes sole have long been considered to be a superior form of cushioning. Notwithstanding this early effort, pneumatic cushioning devices failed for nearly a century, and for a variety of reasons, to achieve commercial success. In fact, until the inventions described in U.S. Pat. Nos. 4,183,156 and 4,219,945 were made, the art lacked the technological know-how to make pneumatic cushioning in shoes commercially successful. The inventions described in these patents revolutionized shoe design and the athletic footwear market place.

More particularly, the cushions described in these patents are well suited to absorb the impact experienced in athletic endeavors and effectively return energy to the athlete. Furthermore, the cushion is well suited to the intense and repetitious impact which occurs during athletic activities.

A pneumatic cushioning device having exceptional longevity can be achieved with a thick, strong, and durable elastomeric envelope. However, a thick envelope mitigates the benefits of fluid cushioning because the characteristics of the fluid are masked by those of the elastomeric barrier material. While it may be possible to form a better containment chamber using a very thick material, the competing interests of intrusive versus unobtrusive envelopes arises when a particular shaped cushion is desired. Moreover, fluids do not have an inherent shape. Therefore, the elastomeric material must assert shaping forces on the fluid. Obviously, a thick, strong elastomeric envelope can easily form complex shapes; however, the performing characteristics of the fluid medium are sacrificed. Accordingly, it is desirable to have a thin-walled envelope to obtain the maximum benefits of fluid cushioning.

Unfortunately, a thin, flexible envelope creates technical difficulty in providing long term retention of an inflatant gas. One alternative to address the loss of inflatant material has been to supply the cushion with a pump element to inflate and/or re-inflate the cushion. One example of this type of system is provided in U.S. Pat. No. 5,937,462 wherein a self-inflatable air cushion includes a collapsible plenum chamber connected to a main support chamber. When the plenum is collapsed by the foot, air is forced out of the plenum chamber, through a one-way valve, into the support chamber. While these types of systems work in theory, in practice, the complexity of a mechanical pumping system creates inherent failure possibilities.

Furthermore, a disadvantage associated with the tremendously successful use of air cushioning systems has been a reliance upon environmentally unfriendly fluorinated hydrocarbon gases which establish an activated diffusion system to maintain a pressurized cushion for many years. While extremely limited quantities are utilized, a negative public perception has become associated with their use. Accordingly, a desire exists to eliminate reliance upon these gases. The dilemma remains that, absent a completely perfect containment system, which has yet to be economically achieved, an environmentally acceptable gas containing cushioning system will at least slowly lose its pressurized inflatant gases.

The present invention provides an advantageous method and system for replenishing an inflatant material and avoids many of the disadvantages outlined above.

Throughout the specification, numerous references will be made to use of the cushion as a portion of the sole of athletic footwear; however, it should be realized that the inventive cushion can be beneficially incorporated into various types of footwear including, but not limited to, dress shoes, boots, sandals, etc. In addition, the cushioning device can provide protection in many types of athletic equipment where these unique cushioning and dynamic characteristics would be beneficial such as football, soccer, baseball, knee, leg, shoulder, neck and arm pads, saddles, helmets, gloves, seat cushions, etc.

SUMMARY OF THE INVENTION

According to one embodiment of the invention, a cushion having at least one chamber comprised of a barrier material is provided. The barrier material can be comprised of an elastomer which is at least semi-permeable to at least a first reactant compound. A second reactant compound is disposed within the chamber, and the first reactant compound and the second reactant compound react together to form a resultant compound. The cushion remains inflated because the rate of diffusion of the resultant compound through the barrier material is less than a rate of diffusion of the first reactant compound through the barrier material.

According to another embodiment of the invention, a cushion having at least one chamber comprised of an elastomeric barrier material is provided. A first and second reactant pair is provided in the chamber. The reactant pair undergo a reaction to generate a gaseous product which functions to maintain inflation of the chamber.

According to a further embodiment of the invention, a cushion having at least one chamber comprised of a barrier material is provided. The barrier material can be comprised of an elastomer through which a first reactant compound is at least semi-permeable. A second liquid or solid reactant compound is disposed within the chamber, and the first reactant compound and the second reactant compound react to form a resultant gaseous compound. The cushion remains inflated because the rate of diffusion of the resultant gaseous compound through the barrier is relatively low or is at least substantially blocked.

Preferably, the cushion includes multiple chambers. Optionally, at least several of the multiple chambers are interconnected. Alternatively, several chambers can be substantially separated but include a gas connecting pathway.

According to several of the embodiments, the first reactant compound can be a gas, a liquid, a solid or mixtures thereof. When the first reactant is expected to enter the chamber from the external environment a liquid or gas is preferred. The second reactant compound will most typically be a liquid or solid.

Exemplary inflatant resultant compounds include carbon dioxide, oxygen and nitrogen. Typically, at least one chamber of the cushion is pressurized to greater than about 14.7 psi. gage pressure.

The present invention is also directed to an article of footwear including the cushion described above and a method of inflating a cushion in an article of footwear

BRIEF DESCRIPTION OF THE DRAWINGS

The invention consists of the novel parts, construction, arrangements, combinations and improvements shown and described. The accompanying drawings, which are incorporated and constitute a part of the specification illustrate the invention and, together with the description, serve to explain the principles of the invention.

Of the drawings.

DETAILED DESCRIPTION OF THE INVENTION

Reference will now be made to the present preferred embodiments of the invention, examples of which are illustrated in the accompanying drawings. While the invention will be described in connection with the preferred embodiments, it will be understood that it is not intended to limit the invention to those embodiments. On the contrary, it is intended to cover all alternatives, modifications and equivalents as may be included within the spirit and scope of the invention defined by the appended claims.

Figure 1:
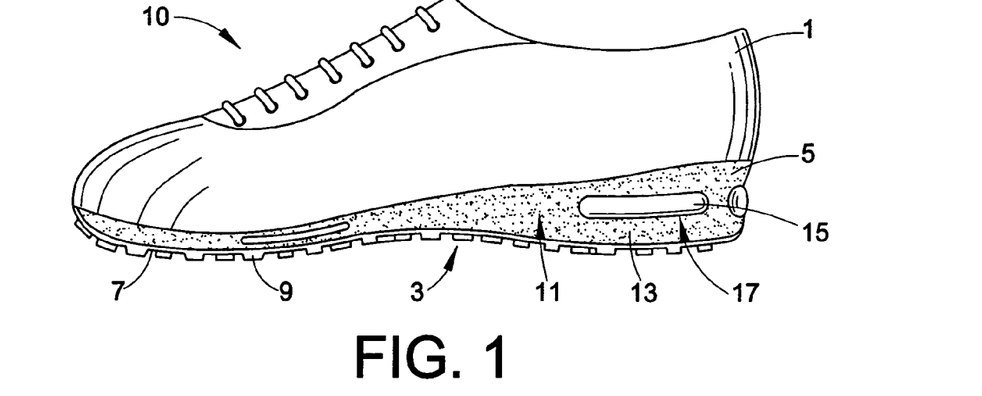
FIG. 1 is a side elevation view of a shoe incorporating one embodiment of the invention.

Referring now to FIG. 1, an article of footwear 10 including a cushioning device is provided. The footwear includes an upper 1 generally made of leather, nylon or other material or other combination of materials known to those of ordinary skill in the art. The upper 1 is formed by any means acceptable to those of skill in the art such as, but not limited to, boardlasting or stitchlasting. The upper shown herein is appropriate for athletic shoes, however, sandal uppers and boot uppers are equally suited for combination with the sole construction of this invention. The sole 3 is secured to the upper by glue and/or stitching, or other techniques well known to those skilled in the art. The preferred sole 3 comprises a midsole portion 5 and outsole portion 7 contacting the ground. The outsole portion 7 is generally textured with tread or studs 9 to facilitate good frictional engagement with the ground or a floor surface. Midsole 11 is comprised of a foam 13 encapsulating medium containing cushioning device 15, visible through view holes 17.

Figure 2:
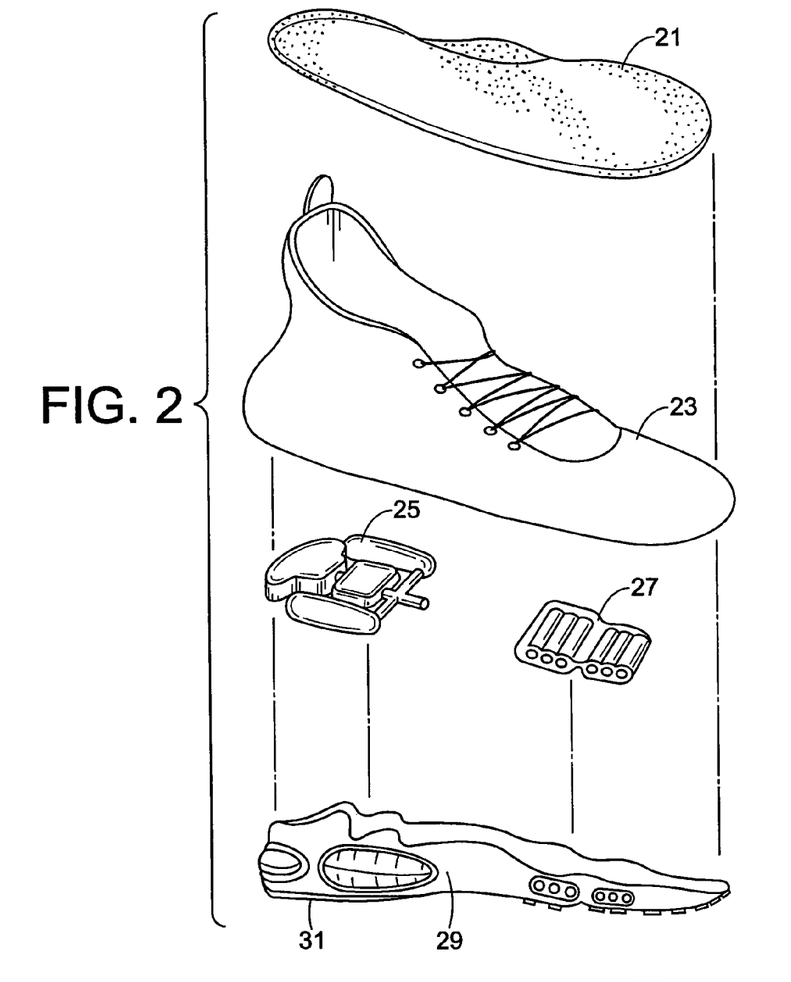
FIG. 2 is a perspective view illustrating the unassembled parts of an exemplary shoe embodiment.

FIG. 2 represents individual shoe components in an exploded pre-construction stage. In this embodiment, a sockliner 21 is positioned within a shoe upper 23 This shoe upper is then laid-up on top of fluid containing multi-chamber cushions 25 and 27 secured in midsole 29. The fluid containing cushions are preferably foam encapsulated as an integral part of midsole 29. The outsole 31 is cemented to the midsole and the resultant product is securely cemented or otherwise attached to the shoe The cushion can be formed of any flexible material which is at least a partial barrier to the diffusion of at least one gas. The cushion is preferably constructed of a flexible polymeric material. Exemplary materials include polyurethane, polyester, fluoroelastomer, chlorinated polyethylene, polyvinyl chloride, chlorosulfonated polyethylene, polyethylene/ethylene vinyl acetate copolymer, neoprene, butadiene acrylonitrile rubber, low density polyethylene, adduct rubber, sulfie rubber, methyl rubber, vulcanizable rubber, polyvinyl alcohol and thermoplastic rubber. Other suitable materials are described in U.S. Pat. Nos. 4,906,502; 5,083,361; 4,936,029; 5,042,176 and 5,713,141, which are herein incorporated by reference. Again, these listed materials are not intended to be limiting. In fact, as more fully described below, one benefit of the present invention is a reduced reliance on the necessity of the material to form an exceptional barrier.

Similarly, the present invention is not limited with respect to the type of footwear or cushion design with which it is used. Exemplary systems include those taught in U.S. Pat. Nos. 3,005,272; 3,685,176; 3,760,056; 4,183,156; 4,217,705; 4,219,945; 4,271,706; 4,287,250; 4,297,797; 4,340,626; 4,370,754; 4,471,538; 4,486,901; 4,506,460; 4,724,627; 4,779,359; 4,817,304; 4,829,682; 4,864,737; 4,864,738; 4,874,640; 4,906,502; 4,936,029; 5,036,603; 5,042,176; 5,083,361; 5,097,607; 5,155,937; 5,228,217; 5,235,715; 5,245,766; 5,283,963; 5,315,769; 5,422,186; 6,127,010; and 6,158,149 each of which is herein incorporated by reference.

The present invention is generally directed to creating a chemical reaction within the cushion which generates an inflatant, the inflatant being at least marginally retained by the barrier material forming the cushion. Preferred inflatants are foams and gases. Marginally retained reflects the fact that the gaseous product is at least temporarily contained in the cushion, providing pressurization thereof, and allowing the cushion to provide cushioning properties typical of pneumatic cushioning devices. Accordingly, the inflatant gas is preferably generated at a rate sufficient to offset the loss of inflatant through the barrier material. In this manner the cushion can remain effectively inflated over an extended period of time. It is noted that the inflatant generating reaction can be used to fully inflate the cushion or as a maintenance charge, wherein the cushion is first inflated by other means during original construction and the reaction generated inflatant used to maintain a desired pressurization. Moreover, the subject invention will gradually and automatically add to the partial pressure of the cushion, thereby pressurizing the cushion, event to above ambient pressure.

The inflatant producing reaction can generally be accomplished in several ways. For example, a first reactant can be provided in the cushion and a second reactant can be obtained through diffusion into the cushion. The second reactant, would preferably be selected from those compounds encountered naturally during normal use of a shoe, water and oxygen make excellent examples. Alternatively, the first and second reactants can both be provided in the cushion. In this case, the use of a naturally occurring diffusing agent could be used as a reaction initiation or rate control mechanism.

The production of an inflatant for maintaining a useful range of pressure within the chamber can be attained by several different methods, and even methods not set forth in this description. A method which can generate gas or foam within a closed polymeric chamber is acceptable. Generally, viable choices of produced inflatant can be anything. For convenience, as these compound are environmentally benign and have been used in footwear cushioning systems before, the generation of nitrogen, oxygen or carbon dioxide are excellent choices. As an example, nitrogen gas can be generated from compounds including urea, potassium nitrate, ammonium sulfate, sodium nitrate, sodium nitrite, ammonia, ammonium chloride, UDMH, nitric acid, ammonium nitrate, etc. As a further example, oxygen gas can be generated from sodium perborate and non-chlorine containing bleaches. As one additional example, carbon dioxide can be generated from acetylsalsilic acid and sodium bicarbonate.

The purpose is to maintain a pressure between, for example, greater than 0 to 25 PSIG over a period of one to three years. Exemplary systems include sublimation, fermentation, unimolecular decomposition of an organic reactant, biomolecular decomposition and molecular reorganization, and chemical reaction.

Sublimation systems use the phase transformation between a solid directly to the gas phase as the source of gas. An immediate example is naphthalene (common mothballs). Fermentation of bio/organic materials also produces gas. Unimolecular decomposition of an organic reactant is a very common method of producing gas, usually either nitrogen or carbon dioxide, for a number of practical applications. The initiation of the decomposition may be by an increase in temperature, application of electric current (either causing a temperature increase or an electrochemical reaction), addition of another chemical reagent which accelerates the decomposition, or simply the "normal" time-dependent decomposition of the substance, usually identified as the same temperature-dependent process occurring at ambient temperature. Free radical initiators for polymerizations and other reactions include those which produce either nitrogen or carbon dioxide gas. A common example is azo compounds, such as azodiisobutyronitrile, which have the general formula of X—N=N—X. These materials decompose to give two free radical species and nitrogen gas.

In addition, a reagent which accelerates the decomposition so that it occurs at lower temperatures could be added. One common example is the addition of a small amount of a tertiary aromatic amine (e.g. dimethyl aniline) to benzoyl peroxide to produce both free radicals and carbon dioxide gas. A triggering system can be provided to control the addition of the reagent, and control the rate of gas evolution.

A contemporary application is the use of more violent reagents to produce large quantities of gas, usually nitrogen, on sudden demand. The prime example is auto safety bags. A ("The") common reagent is sodium azide ($NaN_3$) which is reacted (essentially ignited) by an electric current to produce nitrogen gas. A typical formulation is 70% $NaN_3$, 28% $MoS_2$ and 2% S. These systems are generally violent, but can be adapted to give more gradual and controlled emission of nitrogen. Furthermore, a different organic azide which is not as violent in its reaction can be selected and can be buffered for longer term slow reaction.

Biomolecular decomposition is also a viable means of producing gases. These reactions occur between two species. For example, the production of carbon dioxide by reaction of sodium bicarbonate, $NaHCO_3$ (or sodium carbonate, $NaHCO_3$) with an acid-generating specie, HX, gives very efficient production of $CO_2$. The acid material can be a strong acid (e.g. HCl), a medium strength organic acid (e.g. acetic acid). In fact, other substances which produce acid by slow decomposition could be used.

Production of nitrogen by reaction of sodium nitrite, $NaNO_2$, with ammonium chloride, $NH_4Cl$, (or other ammonium salt) is also a viable option. The reaction mechanism advantageously offers a means of controlling the reaction by buffering adjustment of H+ catalyst action and temperature to attain long-term controlled reaction for production of $N_2$. Of course, there are other nitrite and nitrate compounds that can react in similar fashion to $NaNO_2$ to form $N_2$ that will be apparent to the skilled artisan.

Generally, it may be preferably to have the reaction constituents concentrated in a package within the cushion. If water is needed, it could be provided by normal water permeation into the cushion or by use of some internal reservoir source designed to provide water by permeation out of its container or by some physical method of inducing water flow.

Microencapsulation of one or more of the reactants, including water, can be used for reaction control. One mode of control is by physical rupture of the capsules to release encapsulated reagent to contact the co-reagent for gas production. The rupture process could be made to occur on demand: by designing a plunger and anvil arrangement with encapsulated material on the anvil. When pressure in the container decreases past some value, the weight on the plunger, attached to the roof of the container, would cause it to impact on the encapsulated material on the anvil, attached to the floor of the container.

Another mode of control is by permeation through the walls of a capsule. The reagent, either in liquid form or in solution, diffuses out at a known, predictable rate into a mixture of the other reactant components enclosed within a porous container within the capsule. An alternate method is to have water diffuse into a capsule containing solid reagent, dissolving the reagent, which then diffuses out of the capsule into the reactant mixture. Likewise, a solution of reagent can diffuse into the capsule containing solid co-reactant to cause reaction within the capsule. The gas produced may either diffuse out of the capsule or cause rupture of the wall, releasing all its contents into the surrounding mixture or solution. In any case, as liquid diffuses into the capsule, it swells/expands the capsule increasing the rate of substance transport into and out of the capsule. This general method is commonly used for drug delivery (controlled release), such as controlled release aspirin.

In the case of nitrogen, it is believed that about 0.006 grams of nitrogen will need to be produced on a monthly basis to maintain a suitable cushion pressurization of about 80 cm$^3$ volume cushion. Using the reaction $NaNO_2+NH_4Cl \rightarrow N_2+ 2H_2O+NaCl$, about $4.9\times10$-4 mols $N_2$ will be needed per month. Accordingly, it is anticipated that about $5.9\times10$-3 mols $N_2$ will be needed annually, meaning that to provide a shoe with a five year cushioning lifespan, $29.4\times10$-3 mols $N_2$ should be generated. This correlates to about 0.41 g NaNO2, 0.031 g NH4 Cl per year, which generates about 0.21 g H2O. This can then be used to predict that a five year supply of reagents would require 2.03 g NaNO2 (0.94 cm$^3$) and 1.58 g NH4Cl (1.03 cm$^3$) with 1.06 g water produced. These calculations demonstrate the feasibility of the system from a size standpoint. In addition, it may be desirable to keep the water presence controlled to prevent the reaction from proceeding to quickly and over-inflating the cushion and shortening the overall longevity of the system. Commercial desicant materials show that about 8.83 g may be required creating about 3 cm$^3$ volume. This yields a total system volume of about 5 cm$^3$.

However, the reaction kinetics can lead to a pronounced excess of gas formation. Therefore, the pressures produced can exceed the structural and performance limits of the cushion. Accordingly, the solution can be used in sufficient concentration (thereby also decreasing the volume occupied) that one or more of the reagents is in solid phase in equilibrium with that in solution. Then, when the reaction occurs, consuming the reagent species in solution, it will be replaced by dissolution of solid phase reagent. This imposes a time-dependent process on the reaction that can even-out the rate of gas formation. Alternatively, one or more of the reagents may be encapsulated within a membrane of controlled permeability to the reagent. Thus the reagent will diffuse out of the capsule to combine with the co-reagent for gas production. The co-reagent also may diffuse into the capsule for the same resulting reaction for gas production. Alternatively, the reaction can be controlled through the use of pH, buffering substances, or other reaction modifiers. Similarly, the controlled introduction of water, in the case of a solution based process can also be used to control the rate of reaction.

Advantageously, the moisture vapor transmission rate (MVTR) of H2O through a typical chamber barrier material, eg. polyurethane, can be used to control the water levels in the system. Moreover, by properly conditioning the polyurethane material the chamber can be tailored to pass water vapor from the chamber and prevent the accumulation of water partial pressure that could otherwise result in a run-away N2 generating reaction. The polyurethane can be adjusted as known to the skilled artisan to include more or less cross-linking which allows for increase and decrease in the H2O permeation rates.

Figure 3:
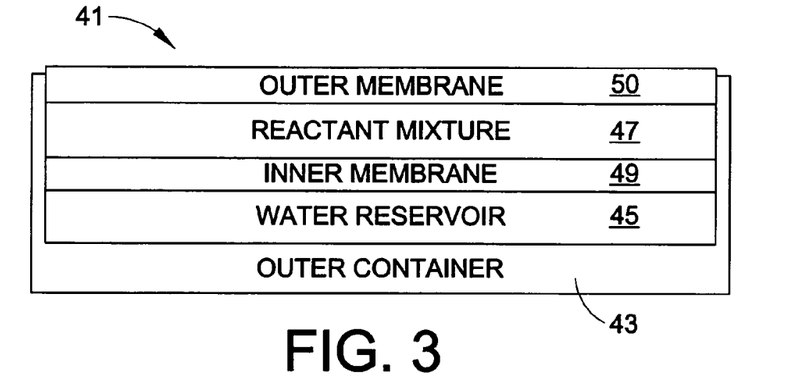
FIG. 3 is a schematic view of a gas delivery apparatus.

FIG. 3 illustrates one possible device 41 for obtaining controlled production of nitrogen gas over a prolonged time period. The outer container 43 is impermeable to all reactants, products, water and gas. In operation, water from water reservoir 45 will permeate into the reactant mixture chamber 47 through membrane 49 at a predetermined rate. The membrane 49 serves to control the rate of permeation of water into the reaction mixture chamber 47. When the permeated water attains a desired concentration it will solvate some of the reactant mixture leading to ionization of the two reactants. Reaction then should occur by the nominal scheme to produce $N_2$ gas and other products.

The outer membrane 50 is permeable to gas (and to water) to serve as a medium for escape of $N_2$ from the reaction chamber to the cushion environment. The gas will eventually escape through the outer membrane 50 to the cushion environment. A minimal amount of water will escape through the outer membrane 50 since the water in the reactant mixture chamber 47 will be strongly complexed in salvation of the ionized reactants and salt product; the thermodynamic activity of water will be low.

It is believed that some ions from the reactant mixture chamber 47 will permeate into the water reservoir. However, it is unlikely that reaction to form $N_2$ will take place in the water reservoir 45. $N_2$ also will permeate into the water reservoir until such time as the concentration (more properly, the thermodynamic activity) of $N_2$ is equal in both the reactant mixture chamber 47 and the water reservoir 45. It may be useful to have an initial concentration of sodium chloride in the water reservoir 45 to both moderate the thermodynamic activity of water (and hence, help control the rate of permeation of water) and to oppose the transport of sodium chloride into the water reservoir 45 from the reactant mixture chamber 47 as the reaction proceeds.

Alternatively, the reactants could be contained either in a tube or two concentric spheres with separate portions holding the reactants and the desiccant. The two portions would be separated by a porous membrane and the top of the tube or the outer shell of the sphere also would be a porous membrane. The porous membrane allows free passage of gases but restricts passage of solids. The arrangement in both cases could force gases to flow through a desiccant portion while either entering or leaving the reactant portion. The sidewall on the bottom of the tube configuration could be impermeable to gases and liquids. Only the top, above the desiccant, would be porous, open to the ambient environment. It is generally believed to be beneficial for this system to use a saturated aqueous solution for the reagents and the solid product NaCl.

A further alternative inflatant production method is the production of $CO_2$ gas by reaction of carbonates with an acid. Acid can be a strong acid such as hydrochloric (HCl), sulfuric ($H_2SO_4$) or phosphoric ($H_3PO_4)_2$ or a medium strength organic acid such as acetic acid ($CH_3COOH$), or a weak (solid) organic acid such as citric ($HOC\{CH_2CO2H\}_2$ or L-ascorbic (vitamin C, $C_6H_8O_6$). A solid acid would probably require the presence of water (or other liquid medium) to promote the reaction. Water, per se, will slowly react with carbonates with a rate depending on the presence of trace acid ($H^+$) as a catalyst. All of the above acids can be represented as HX.

EXAMPLES

The following examples are provided to provide further description of the invention, but are not intended to show any limitation to the scope of the invention defined in the appended claims.

Example 1

Demonstration of Chemical Reaction

Simple experiments were run to examine the characteristics of one reaction.

0.5 gm of $NH_4Cl$ and 0.6 gm of $NaNO_2$ were placed in 8.7 ml total volume container with $H_2O$ to form a 1 M solution of each salt. No bubbles indicating the formation of nitrogen were apparent during the mixing process or at room temperature after one hour. The reaction was heated to around 80° C. at which time bubbles appeared.

In order to speed the reaction, the reaction was repeated using the same salt concentrations and solution volume but acetic acid was added. A few drops of acetic acid produced some bubbles at room temperature. More acid was added (3 ml) at which time the gas evolved moderately. The experiment was repeated using the same conditions only measuring the amount of gas produced via water displacement. The amount of $N_2$ gas actually displaced was approximately 93 ml total.

Example 2

Demonstration of Chemical Reaction

The reaction was run in a sealed pressure chamber equipped with a pressure gauge using 8.7 ml of 1M $NH_4Cl$ and 1 M $NaNO_2$ (referred in the following table as "Tablets") as in the previous experiments. The apparatus was placed in the oven at 100° C. Over time, the pressure increased until after approximately 5 hours, the pressure was 42 psi. The sample chamber volume was approximately 60 ml.

Example 2

Manufacture of Reactive Pellets

Mixtures were made of equimolar concentration of reactants such that each pellet contained $3 \times 10^{-3}$ mols (0.003 mol) of each reactant.

| Weight per pellet: | |
|---|---|
| Sodium nitrite ($NaNO_2$) | 0.207 gram |
| Ammonium chloride ($NH_4Cl$) | 0.161 gram |
| Total | 0.368 gram |

Example 3

Thirteen tests were performed wherein a metallized polyolefin bag was filled with reactant tablets as shown in the following table. Water was included in the form of porous paper having the water absorbed therein. The bags were sealed and observed as described in the table.

| Test # | Gas | Time | Inflation Thickness of Bag | Tablets | $H_2O$ | Comments |
|---|---|---|---|---|---|---|
| 1 | $CO_2$ | 0 hr. 10 days | 0 Exploded | 1 Alka Seltzer | Damp Paper | Pressurized to ~3 or 4 psig; exploded |
| 2 | $N_2$ | 0 hr. 20 days 60 days | 0 days Large balloon 1.2" | 6 of Ex. 2 | 2 cc. Damp Paper | Fully inflated |
| 3 | $N_2$ | 0 hr. 20 days 60 days | 0 10% balloon .610" | 3 of Ex. 2 | 2 cc. Damp Paper | Fully inflated |
| 4 | $N_2$ | 0 hr. 42 days | 0 .325" | 1 of Ex. 2 | 1 cc. Damp Paper | 20% inflated |
| 5 | $N_2$ | 0 hr. 42 days | 0 .360" | 1 of Ex. 2 | 2 cc. Damp Paper | 30% inflated |
| 6 | $N_2$ | 0 hr. 42 days | 0 10% balloon | 1 of Ex. 2 | 1 cc. Damp Paper | 10% inflated |
| 7 | $N_2$ | 0 hr. 42 days | 0 10% balloon | 2 of Ex. 2 | 2 cc. Damp Paper | Fully inflated, maybe slight pressure |
| 8 | $N_2$ | 0 hr. 42 days | 0 .300" | 3 of Ex. 2 | 2 cc. Damp Paper | 10% inflated |
| 9 | $CO_2$ | 0 hr. 30 days | 0 .920" | 1 Alka Seltzer | 3 cc. Damp Paper | Ambient press; fully inflated |
| 10 | $N_2$ | 0 hr. 29 days | 0 2.34" | 4 of Ex. 2 | 3 cc. Damp Paper | 1 oz. psi fully inflated |
| 11 | $N_2$ | 0 hr. 23 days | 0 | 9 of Ex. 2 | 0 | partially inflated |

One additional hurdle faced by the present cushion inflation disclosure is a result of commonly used footwear cushion designs. Particularly, many fluid inflated footwear cushions of today are multi-chambered, having no communication between chambers. To keep each chamber inflated in accord with the present invention, a gas source would have to be incorporated in each chamber. This may be impractical. One additional solution can be the use of diffusion or restricted communication paths between cells. These paths would not permit rapid pressure equalization between linked chambers, as it is often desirable to keep adjacent chambers at different pressures, but would allow the slow diffusion of gas from a chamber containing a gas generation system to chambers without gas generating systems. These pathways could be controlled by pin hole passages (e.g. 0.0000004 in.-0.01 in.) one-way pressure valves or preferably be provided by thread(s) embedded in the welds in the elastomeric material forming the chambers and extending between chambers. These thread(s) provide a diffusion path. Advantageously, the thread diameter and whether of not it is solid or hollow can be characteristics modified to tailor the rate of diffusion between chambers. Therefore, two adjacent high pressure chambers may use a large diameter thread or a hollow thread to allow relatively rapid diffusion, while adjacent high and low pressure chambers may use a solid small diameter link thread to allow only a limited re-inflation rate.

Figure 4:
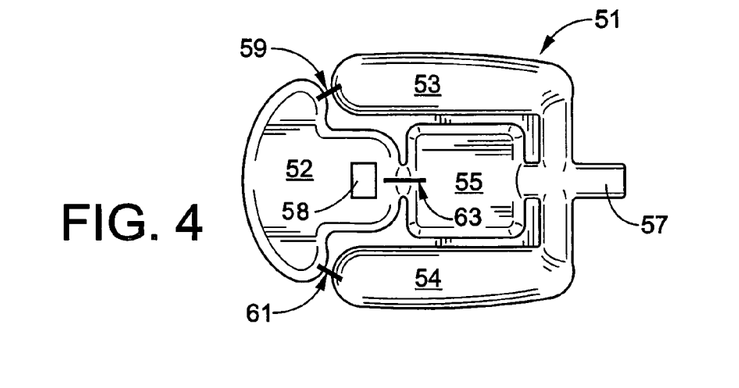
FIG. 4 is a schematic view of a textured cushion in accord with the invention, and FIG. 5 a schematic view of a gas delivery system.

An example of a cushion designed in this fashion is shown in FIG. 4, wherein cushion 51 includes multiple chambers 52-55. Each of these chambers can be initially inflated with nitrogen (e.g. through port 57) to a desired pressure such as 0 to 35 psig and communication sealed between the chambers. Chambers 52, 53, and 54 are high pressure chambers (eg. 15 psig), chamber 55 is a relatively low pressure chamber (eg. 5 psig). A re-inflatant device 58 is provided in heel chamber 52. Device 58 functions in accord with the prior description to generate an inflatant gas and maintain the desired pressurization of the cushion. Large diameter threads (eg. 0.00004 in. to 0.001 in.) 59 and 61 are provided between chambers 52-53 and 52-54, respectfully the fibers being embedded in the elastomeric material forming the seal between the chambers, yet having ends extending into each chamber. A relatively narrow diameter thread 63 (eg. 0.0000004 in. to 0.00004 in.) is provided between chambers 52 and 55.

Figure 5:
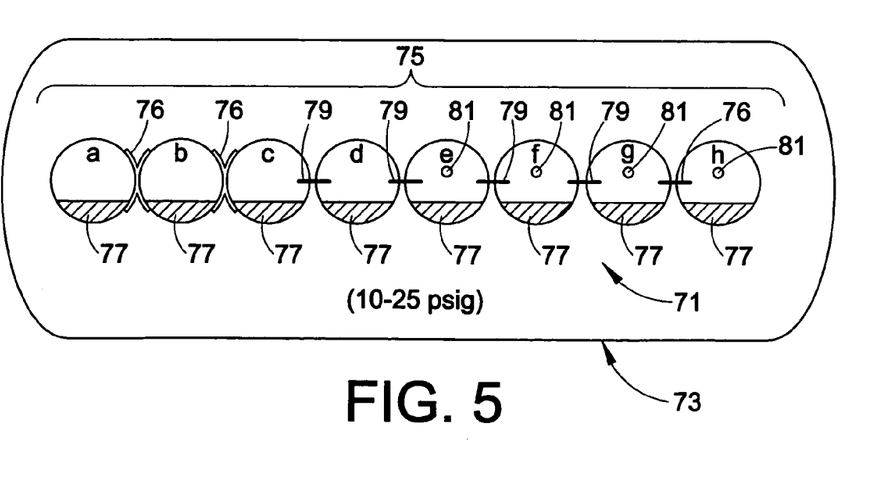

The type of chamber inflatant communication system described above can also be advantageously used in the design of the inflatant device. Moreover, an inflatant device providing a controlled rate of reaction can be constructed. Referring now to FIG. 5, cascade gas generation system 71 is displayed within a cushion 73 having a pressure between 10-25 psig for example.

The system 71 is comprised of an elastomeric material forming a plurality of cells 75*a-h*. Cells 75*a-h* are partially filled with solid reagent 77 such as Tablets from the prior examples. Cells 75*a-c* are preferably comprised of a semi-permeable barrier material, e.g. polyurethane, which permits permeation of water and of the generated nitrogen gas. Cells 75*d-h* are preferably comprised of a generally non-permeable material such as described in U.S. Pat. No. 6,251,305, herein incorporated by reference. In this respect, cells 75*d-h* can be isolated from water which would otherwise initiate the nitrogen gas generating reaction. In this manner, the reagent 77 in cells 75*d-h* is held in reserve. Cell 75*a* is initially provided with a sufficient quantity of water to initiate the nitrogen gas generation reaction. This water could be intentionally injected into the cell or we can rely on the natural diffusion of water through the walls of the cell. The presence of even a small amount of water within the cells can initiate reaction of reagent 77.

Pressure ideally builds up to a high pressure in cell 75*a*, e.g. above the initial inflation pressure of cushion 73, at a controlled rate and maintains high pressure for several 5-6 months, at which time the cell runs out of reagent and the pressure falls. During this time, generated nitrogen, as a result of activated diffusion, permeates the walls of cell 75*a* and provides inflatant gas to cushion 73. Furthermore, nitrogen gas and water vapor can transport from cell 75*a* to cell 75*b*. This process is facilitated by providing a common wall 76 between cells 75*a* and 75*b*, and 75*b* and 75*c*. Furthermore, excess water vapor generated by the reaction in cell 75*a* can permeate the wall of cell 75*a*, thereby adding to the water vapor in cushion 73. This water vapor, in turn, permeates the walls of cells 75*b* and 75*c*, causing the nitrogen generation process to start in these cells.

Also, some water vapor enters the wall of cell 75*b* from the water vapor in the cushion 73. Therefore, sequentially nitrogen gas pressure builds up in cell 75*b*. There may be some time overlap between the build-up of nitrogen gas pressure in cell 75*b*, and the fall off of pressure in cell 75*a*. Importantly, this process recreates itself throughout the string of cells 75*a-c*. With respect to cells 75*d-h*, held in reserve, a small diameter fiber 79—as described above—is used to communicate water vapor from cell 75*c* to all 75*d* and initiate the nitrogen generating reaction. This procedure is repeated for cells 75*e-h*. It is noted that each of cells 75*e-h* is provided with a nitrogen gas escape mechanism such as pin hole opening, fiber path or valve 81 to allow nitrogen gas escape to the cushion 73. In this manner, long term control of the nitrogen generating reaction is provided.

As discussed earlier, this system demonstrates the advantageous use of MVTR to control the rate of $N_2$ generation. Furthermore, it is expected that MVTR will help control excess water vapor generation in any particular cell. Moreover, a high water vapor content within any cell will naturally diffuse outwardly to a lower humidity level within cushion 73.

Thus, it is apparent that there has been provided, in accordance with the invention, an article of footwear that fully achieves the advantages set forth above. While the invention has been described in conjunction with specific embodiments thereof, it is evident that many alternatives, modifications, and variations would be apparent to those skilled in the art in light of the foregoing description. Accordingly, it is intended to embrace all such alternatives, modifications, and variations as fall within the spirit and broad scope of the appended claims.

What is claimed is:

1. A shoe cushion comprised of at least one chamber comprised of a barrier material, said cushion having a thickness of at least 0.400 inches, said barrier material comprised of an elastomer, said elastomer being at least semi-permeable to at least a first reactant compound, at least a second reactant compound disposed within said at least one chamber, wherein said first reactant compound and said second reactant compound interact to form a resultant gaseous compound selected from $O_2$, $N_2$, and $CO_2$ at least partially inflating the cushion, wherein said at least one chamber is pressurized to greater than about 14.7 psi. gauge pressure by said resultant gaseous compound, and wherein a rate of diffusion of said resultant gaseous compound through said barrier material is less than a rate of diffusion of said first reactant compound through said barrier material.

2. The cushion of claim 1 further comprising foam encapsulation of said chamber.

3. The cushion of claim 1 further comprising a mechanical cushioning member disposed within said chamber.

4. The cushion of claim 1 wherein said first reactant compound comprises a gas, a liquid or mixtures thereof.

5. The cushion of claim 1 wherein said second reactant compound is a solid.

6. The cushion of claim 1 wherein said resultant compound comprises at least one gas.

7. The cushion of claim 1 wherein said first reactant compound comprises a gas or liquid.

8. The cushion of claim 1 wherein said second reactant compound comprises a nitrogen containing compound.

9. The cushion of claim 1 wherein said first reactant compound is provided within said chamber.

10. The cushion of claim 1 wherein at least a portion of said first reactant compound diffuses into said chamber from outside said cushion.

11. The cushion of claim 1 further comprising multiple chambers.

12. The cushion of claim 11 wherein at least several of said multiple chambers are interconnected.

13. The cushion of claim 1 wherein said first reactant compound comprises a catalyst or solubilizing agent facilitating the formation of said resultant compound.

14. The cushion of claim 13 wherein said first reactant compound comprises water.

15. A shoe cushion comprised of:
at least one chamber at least partially encapsulated by foam, said chamber comprised of a barrier material, said barrier material comprised of an elastomer, said elastorner being at least semi-permeable to at least a first reactant compound;
at least a second reactant compound disposed within said at least one chamber; and
wherein said first reactant compound and said second reactant compound interact to form a resultant inflatant compound selected from $O_2$, $N_2$, and $CO_2$ at least partially inflating said cushion, wherein said at least one chamber is pressurized to greater than about 14.7 psi. gauge pressure by said resultant inflatant compound, and wherein a rate of diffusion of said resultant inflatant compound Through said barrier material is less than a rate of diffusion of said first reactant compound through said barrier material.

16. The cushion of claim 15 further comprising multiple chambers.

17. The cushion of claim 16 further comprising foam encapsulation of said chamber.

18. The cushion of claim 16 further comprising means for gas diffusion between said at least one chamber and an adjacent chamber.

19. A shoe cushion comprised of:
a plurality of chambers, at least one chamber comprised of a barrier material, said barrier material comprised of an elastomer, said elastomer being at least semi-permeable to at least a first reactant compound;
at least a second reactant compound disposed within said at least one chamber; and
wherein said first reactant compound and said second reactant compound interact to form a resultant gaseous compound selected from $O_2$, $N_2$, and $CO_2$ inflating said at least one chamber, wherein said at least one first chamber is pressurized to greater than about 14.7 psi. gauge pressure by said resultant gaseous compound, and wherein a rate of diffusion of said resultant gaseous compound through said barrier material is less than a rate of diffusion of said first reactant compound through said barrier material.

20. A shoe cushion comprised of:
at least one chamber comprised of a barrier material, said barrier material comprised of an elastomer, said elastomer being at least semi-permeable to at least a first reactant compound;
at least a second reactant compound disposed within said at least one chamber;
wherein said first reactant compound and said second reactant compound interact to form a resultant inflatant compound selected $O_2$, $N_2$, and $CO_2$ pressurizing said at least one chamber to greater than about 14.7 psi. gauge pressure thereby at least partially inflating the cushion, and wherein a rate of diffusion of said resultant inflatant compound through said barrier material is less than a rate of diffusion of said first reactant compound through said barrier material; and
further comprising a mechanical cushioning member disposed within said chamber.

21. A shoe cushion comprised of:
at least one chamber comprised of a barrier material, said barrier material comprised of an elastomer, said elastomer being at least semi-permeable to at least a first reactant compound;
at least a second reactant compound disposed within said at least one chamber;
wherein said first reactant compound and said second reactant compound interact to form a resultant inflatant compound selected from $O_2$, $N_2$ and $CO_2$ pressurizing said at least one chamber to greater than about 14.7 psi. gauge pressure thereby at least partially inflating the cushion, and wherein a rate of diffusion of said resultant inflatant compound through said barrier material is less than a rate of diffusion of said first reactant compound through said barrier material; and
further comprising fibrous interconnection between opposed walls of said chamber.

* * * * *